No. 729,035. PATENTED MAY 26, 1903.
R. B. BENFORD.
CRUPPER BLIND.
APPLICATION FILED MAY 24, 1902.
NO MODEL.
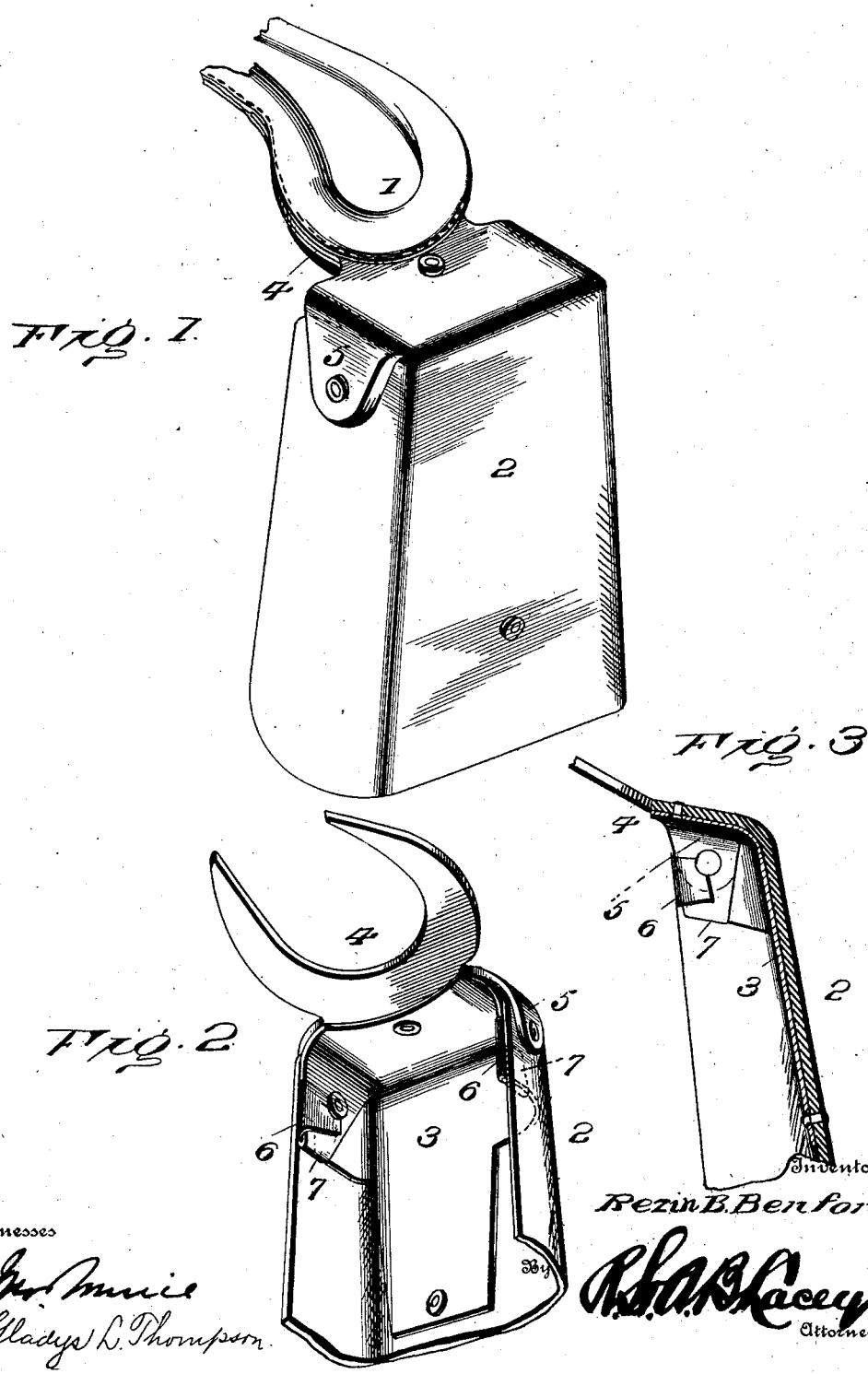

No. 729,035. Patented May 26, 1903.

UNITED STATES PATENT OFFICE.

REZIN BARTLEY BENFORD, OF SHARPSBURG, PENNSYLVANIA.

CRUPPER-BLIND.

SPECIFICATION forming part of Letters Patent No. 729,035, dated May 26, 1903.

Application filed May 24, 1902. Serial No. 108,819. (No model.)

*To all whom it may concern:*

Be it known that I, REZIN BARTLEY BENFORD, a citizen of the United States, residing at Sharpsburg, in the county of Allegheny and State of Pennsylvania, have invented certain new and useful Improvements in Crupper-Blinds; and I do hereby declare the following to be a full, clear, and exact description of the invention, such as will enable others skilled in the art to which it appertains to make and use the same.

This invention relates to a cover of novel formation for concealing the anus of driving animals, such as a horse, thereby preventing the unpleasant sight and the consequent annoyance frequently experienced by persons when out driving and the animal excretes.

The cover or blind is of peculiar construction and is attached to the crupper and is pendent therefrom, so as to extend over the parts without interference with the tail or the free discharge of the excrement.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a crupper having the blind or cover attached thereto in accordance with this invention. Fig. 2 is a perspective view of the blind or cover detached from the crupper, showing the under side thereof. Fig. 3 is a vertical central section of the blind or cover when detached from the crupper.

Corresponding and like parts are referred to in the following description and indicated in all the views of the drawings by the same reference characters.

The crupper 1 may be of any pattern and construction and has the blind or cover 2 attached thereto and pendent therefrom, so as to lie close against the parts of the animal. The blind or cover 2 is approximately of scoop form and is preferably constructed of stout leather reinforced by a metal stiffener 3. The upper end of the blind or cover is provided with straps 4, by means of which the blind is attached to the crupper, preferably by being stitched in between the edge portions of the part forming the crupper-loop. The straps 4 are preferably an integral part of the material forming the blind or cover, so as to reduce the cost of construction and minimize the number of seams or joints. Wings 5 are provided at the sides of the blind or cover near its upper end and overlap the upper ends of the side portions and are secured thereto by rivets or other fastenings. The blind or cover may be of any size best suited to the animal for which the device is intended.

The stiffener 3 is constructed of sheet metal and approximates the shape of the blind or cover and is located upon the inner side thereof. This stiffener 3 constitutes a reinforcement and preserves the shape of the blind and is provided at its upper end with wings 6 and 7, which overlap and have their end portions bent in opposite directions, so as to embrace and confine the wings. A pair of wings 6 and 7 is provided at each side of the stiffener, as clearly indicated. The stiffener 3 enables comparatively light material being used in the construction of the blind or cover; but within the purview of the invention said stiffener may be dispensed with, and in this event the blind or cover must be sufficiently stout to maintain its shape under all conditions.

Having thus described the invention, what is claimed as new is—

1. An attachment for cruppers comprising a blind or cover constructed of sheet material having its sides and top bent over, the end portions of the top forming wings and overlapping the upper ends of the side portions of the said blind and secured thereto, substantially as described.

2. An attachment for cruppers comprising a blind or cover constructed of sheet material having its sides and top portion bent over, the end portions of the top overlapping the upper side portions and secured thereto, integral straps extended from the top for connection with the crupper-strap, and a stiffener constructed of a shape corresponding to the shape of the blind and secured thereto, substantially as specified.

3. In combination with a blind or cover of approximately scoop form, a sheet-metal stiffener applied thereto and having overlapped wings at its upper corners, substantially as set forth.

4. In combination with a blind or cover of approximately scoop form, a sheet-metal stiffener fitted thereto and comprising a pair of wings at its upper corners, the wings of each pair being overlapped and having their end portions bent in opposite directions, substantially as set forth.

In testimony whereof I affix my signature in presence of two witnesses.

REZIN BARTLEY BENFORD. [L. S.]

Witnesses:
 WM. THOMAS,
 A. S. HITER.